(12) United States Patent
Kwan

(10) Patent No.: US 8,295,561 B2
(45) Date of Patent: Oct. 23, 2012

(54) KNOWLEDGE LEARNING SYSTEM AND PROCESS FOR FINGERPRINT VERIFICATIONS

(75) Inventor: Chiman Kwan, Rockville, MD (US)

(73) Assignee: Signal Processing, Inc., Rockville, MD (US)

( * ) Notice: Subject to any disclaimer, the term of this patent is extended or adjusted under 35 U.S.C. 154(b) by 969 days.

(21) Appl. No.: 12/264,499

(22) Filed: Nov. 4, 2008

(65) Prior Publication Data

US 2010/0111378 A1  May 6, 2010

(51) Int. Cl.
 *G06K 9/00* (2006.01)

(52) U.S. Cl. ........................................ 382/125; 382/124
(58) Field of Classification Search .................. 382/125, 382/124
See application file for complete search history.

(56) References Cited

U.S. PATENT DOCUMENTS

| 5,572,597 | A  | * | 11/1996 | Chang et al. | ................... | 382/125 |
| 6,546,122 | B1 | * | 4/2003  | Russo        | ...........................| 382/125 |
| 6,983,062 | B2 | * | 1/2006  | Smith        | ...........................| 382/124 |

\* cited by examiner

*Primary Examiner* — Chan S Park
*Assistant Examiner* — Ha Le
(74) *Attorney, Agent, or Firm* — Ming Chow; Sinorica, LLC

(57) ABSTRACT

This invention relates to a novel technology of fingerprint verifications and identifications based on the accumulated knowledge base.

6 Claims, 3 Drawing Sheets

KNOWLEDGE LEARNING SYSTEM AND PROCESS FOR FINGERPRINT VERIFICATIONS

FIELD OF INVENTION

This invention relates to a novel technology of fingerprint verifications and identifications based on the accumulated knowledge base.

BACKGROUND OF THE INVENTION

Fingerprint has been widely used in forensics and applications that need high security. In recent years, low-cost fingerprint tools have been developed and integrated into biometric mouse, keyboards, laptops, cell phones, etc. to enhance security of small-to-medium scale applications (about 1 to 100 users). For small-to-medium scale applications, system cost is a key factor. To save cost, low cost sensors (a few dollars) are normally used. However, low cost sensors have low quality. In general, cost is proportional to the scan area of the sensor. For example, low cost fingerprint sensors have small areas that can only capture a small section of the fingerprint. Consequently the fingerprint verification performance will degrade. Normally, when a user is being rejected three times during the fingerprint verifications or identifications, the verifications process terminates without offering further trials of fingerprint scanning. The failure of verification caused by the low quality of fingerprint scanning may eventually affect users' confidence in using the fingerprint approach. In addition, using small partial fingerprints for verifications also have high probability of risks in a final determination of the verification.

SUMMARY OF THE INVENTION

The current invention of the fingerprint analysis is independent of the quality or manufacturer of any fingerprint scanners available on the market. The analysis of fingerprints of the current invention is based on accumulative fingerprint image data that are collected from repeated fingerprint scanning before a final determination of the verification is reached.

DETAIL DESCRIPTIONS OF THE INVENTION

Figure 1:
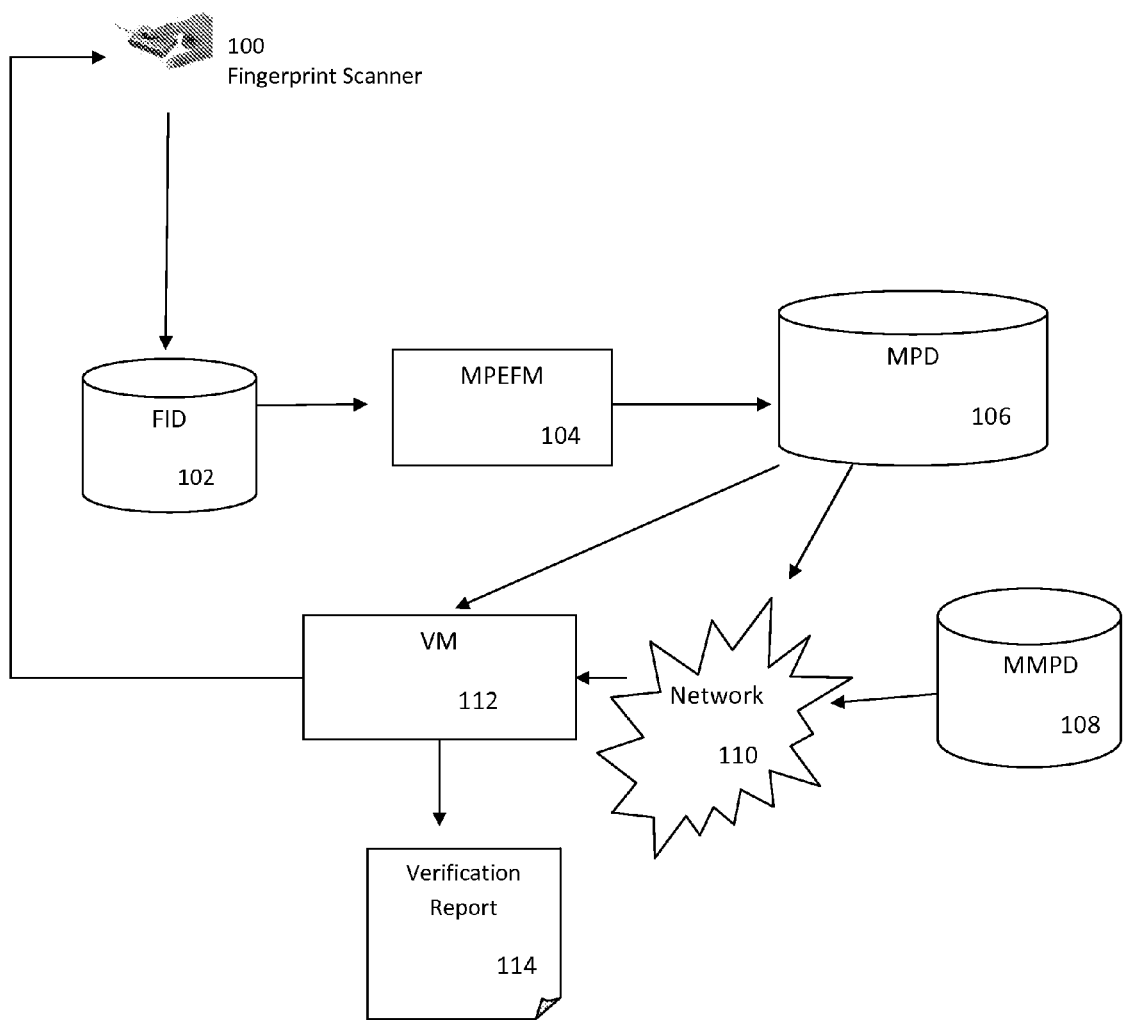
FIG. 1 is a system architecture of the current invention.

The present invention provides a system and methods to collect, analyze, and verify fingerprint image data that are collected through a fingerprint scanner. The traditional fingerprint verifications or identifications (collectively, hereafter, are called "verifications") are based on one set of fingerprint image data for analysis and verification. Due to the quality of fingerprint scanners, scanning area, or human errors the collected image data may not meet the minimum requirements for verifications. When a verification fails, the system may offer another opportunity to the user to scan the fingerprint for another set of image data. However, for the same or similar reasons the second set of image data may still not meet the requirements for a determination of the verification. The user may be offered a pre-defined number of trials for scanning his fingerprints if the verification continues to fail. The basic problem is, no matter how many trials of re-scanning, each verification process is based on one set of image data from each re-scanning.

The current invention discloses a system and method that collects, analyzes, and learns each set of image data through the initial scanning and re-scanning for a final determination of the verification. The final determination of the verification may be achieved by a successful verification or a rejection after a pre-defined number of re-scanning resulting failures of the verification. From the initial scanning through the repeated re-scanning and until the final determination is made, each set of collected fingerprint image data are analyzed, learned, accumulated and integrated for the final determination. The image data are therefore, through re-scanning, growing with more information for the final determination. The issues of scanner quality, image scanning area, human errors, etc. are consequently overcome and the final determination of the verification is achieved with high confidence and detailed fingerprint data.

The system of current invention includes Fingerprint Scanner 100, Fingerprint Image Database (FID) 102, Minutiae Point Extraction and Fusion Module (MPEFM) 104, Minutiae Point Database (MPD) 106, Master Minutiae Point Database (MMPD) 108, Verification Module (VM) 212. For specific application requirements, other system elements may be added or coupled to the current invention.

The fingerprint verification of the current invention begins by scanning a user's fingerprint via a fingerprint scanner (hereafter "scanner"). The current invention is independent of the type of the fingerprint scanner, the quality of the scanner, or the make of the scanner. Any fingerprint scanner that is available on the market can be used to work with the current invention. The scanner scans the user's fingerprint and collects the fingerprint image data. The image data are first stored in the FID. In response of receiving the scanned image data the MPEFM begins the process of minutiae point extractions. There are several minutiae point extraction algorithms known to one skilled in the art. The current invention is also independent of the selection of a preferred algorithm for the purpose of minutiae extractions.

The extracted minutiae points are stored in the MPD by a minutiae point file containing all minutiae points information. Each of the minutiae points is represented by a vector with its location information denoted by x-coordinate, y-coordinate, and degree of angle $[x, y, \theta]$. Collectively, all minutiae points are represented in the minutiae file as, $$\begin{bmatrix} x1 & y1 & \theta1 \\ x2 & y2 & \theta2 \\ x3 & y3 & \theta3 \\ & \ldots & \end{bmatrix}$$

where x: x-coordinates, y: y-coordinates, $\theta$: angles

The x-coordinates, y-coordinates, and angles are referenced to a coordinate system defined by the algorithm used for extractions of the minutiae points.

The initial minutiae file representing the plurality of identified minutiae points is compared with the master minutiae files, by the Verification Module (VM), that have been stored in the MMPD to reach a decision of the verification. The criteria of a successful or a failed verification is a pre-defined requirement in terms of percentage of matching between the collected/identified minutiae points and the minutiae points in the MMPD. When the minutiae points collected from the initial fingerprint scanning meet the pre-defined requirement of the verification, the verification concludes with a report 24 of successful result and the verification terminates.

As previously described, due to the quality of scanners, area of scanning, and human errors, etc., most of the time the initial scanning may not collect enough minutiae points in order to meet the verification requirements for a successful result. The user to be verified will be requested to re-scan his fingerprints. The second scanning of the user's fingerprints repeats the same process as the initial scanning that has been described above to the point when a new set of minutiae points are identified. After the new set of minutiae points are identified, the second minutiae file is created as, $$\begin{bmatrix} x12 & y12 & \theta12 \\ x22 & y22 & \theta22 \\ x32 & y32 & \theta32 \\ \ldots & & \end{bmatrix}$$

where x: x-coordinates, y: y-coordinates, θ: angles

The first and second sets of minutiae points that are represented by the first minutiae file and the second minutiae file respectively may be referenced to different coordinate systems. In order to eliminate the differences of the minutiae files that are caused by the different referenced coordinates, a fusion process to correlate the two minutiae files onto a same coordinate system is performed. The fusion process is performed by the MPEFM by applying a reference coordinate to each of the minutiae file. The fusion process for correlating the two minutiae files is represented by, $$\begin{bmatrix} xr1 \\ yr1 \\ \theta r1 \\ \ldots \end{bmatrix} = \begin{bmatrix} T11 & T12 & T13 \\ T21 & T22 & T23 \\ T31 & T32 & T33 \\ \ldots & \ldots & \ldots \end{bmatrix} * \begin{bmatrix} x1 & y1 & \theta1 \\ x2 & y2 & \theta2 \\ x3 & y3 & \theta3 \\ \ldots & & \end{bmatrix}$$

$$\begin{bmatrix} xr12 \\ yr12 \\ \theta r12 \\ \ldots \end{bmatrix} = \begin{bmatrix} T21 & T22 & T23 \\ T31 & T32 & T33 \\ T41 & T42 & T43 \\ \ldots & \ldots & \ldots \end{bmatrix} * \begin{bmatrix} x12 & y12 & \theta12 \\ x22 & y22 & \theta22 \\ x32 & y32 & \theta32 \\ \ldots & & \end{bmatrix}$$

The fusion process will then identify same minutiae points and additional minutiae points that are collected by the second scanning.

A new integrated minutiae file is then created to represent all identified minutiae points that have been collected by the first scanning and the second scanning. Each minutiae point is only represented by one single entry in the new integrated minutiae file.

The new integrated minutiae file is then compared, by the VM, with the master minutiae files. Based on the predefined verification requirements in terms of percentage of matching between the collected/identified minutiae points and the minutiae points in the MMPD, a conclusion is determined for the verification.

When the determination of verification continues to fail and before a pre-determined number of re-scanning are completed, the re-scanning process, the minutiae points extractions, the fusions process, etc. as described above for the re-scanning are repeated. The repeating of the re-scanning and processes as described is terminated at the time when a successful verification is concluded or the pre-determined number of re-scanning is reached.

Application Process

Figure 2:
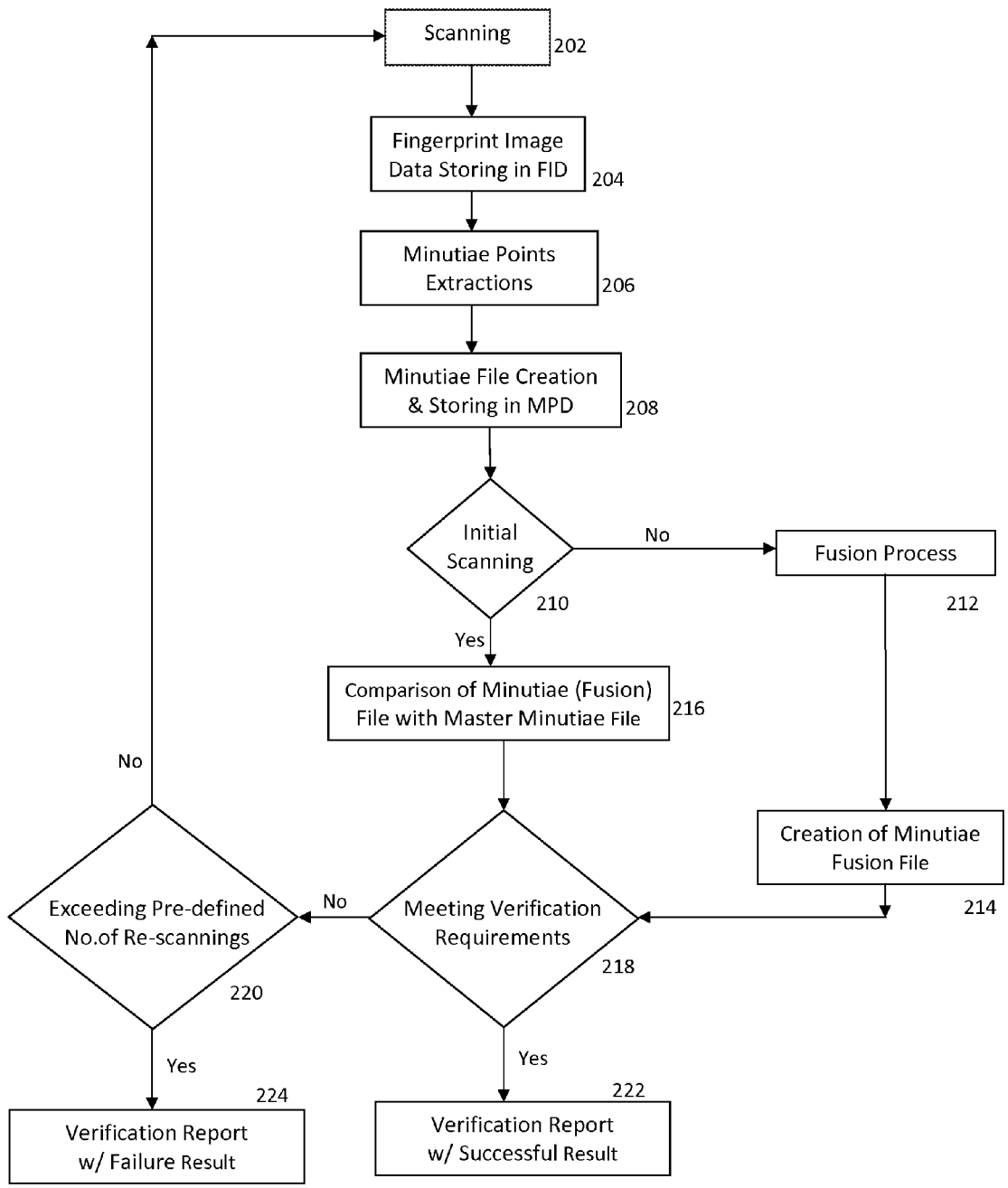
FIG. 2 is the flow process showing the methods of performing the current invention.

The FIG. 2 shows the process and methods of the current invention.

Step 202: The scanning of an user's fingerprint.

Step: 204: The scanned fingerprint image data are stored in the FID.

Step 206: The MPEFM performs extractions to extract the minutiae points from the minutiae scanned fingerprint image data.

Step 208: A minutiae file is created representing all extracted minutiae points. The minutiae file is stored in the MPD.

Step 210: A decision is made to determine if the minutiae file was created by an initial scanning or a re-scanning.

Step 216: When the determination made by Step 210 is "an initial scanning", the created minutiae file is compared with a pre-defined master minutiae file.

Step 218: A decision is made to determine if the comparison made by Step 216 meets the pre-defined requirements for the verification.

Step 222: When the determination made by Step 218 is "meeting the pre-defined requirements", a report with a successful result is concluded.

Step 212: When the determination made by Step 210 is "re-scanning", a fusion process is performed by the MPRFM to correlate the previously identified minutiae points and the minutiae points identified from the re-scanning. The fusion process is to correlate the previously created minutiae file or minutiae fusion file, and the current minutiae file by referencing to a same coordinate system.

Step 214: A minutiae fusion file is created to represent all minutiae points from the initial scanning and re-scanning. The created minutiae fusion file is input to Step 218 for comparisons.

Step 220: When the determination of Step 218 is "not meeting the pre-defined requirements", a decision is further made if the number of re-scanning has exceeded the pre-determined requirements. When the decision made by Step 220 is "not exceeding the pre-defined number of re-scanning", the process returns to Step 202 for next re-scanning.

Step 224: When the decision made by Step 220 is "exceeding the pre-defined number of re-scanning", the process terminates by concluding with a failure report.

Figure 3:
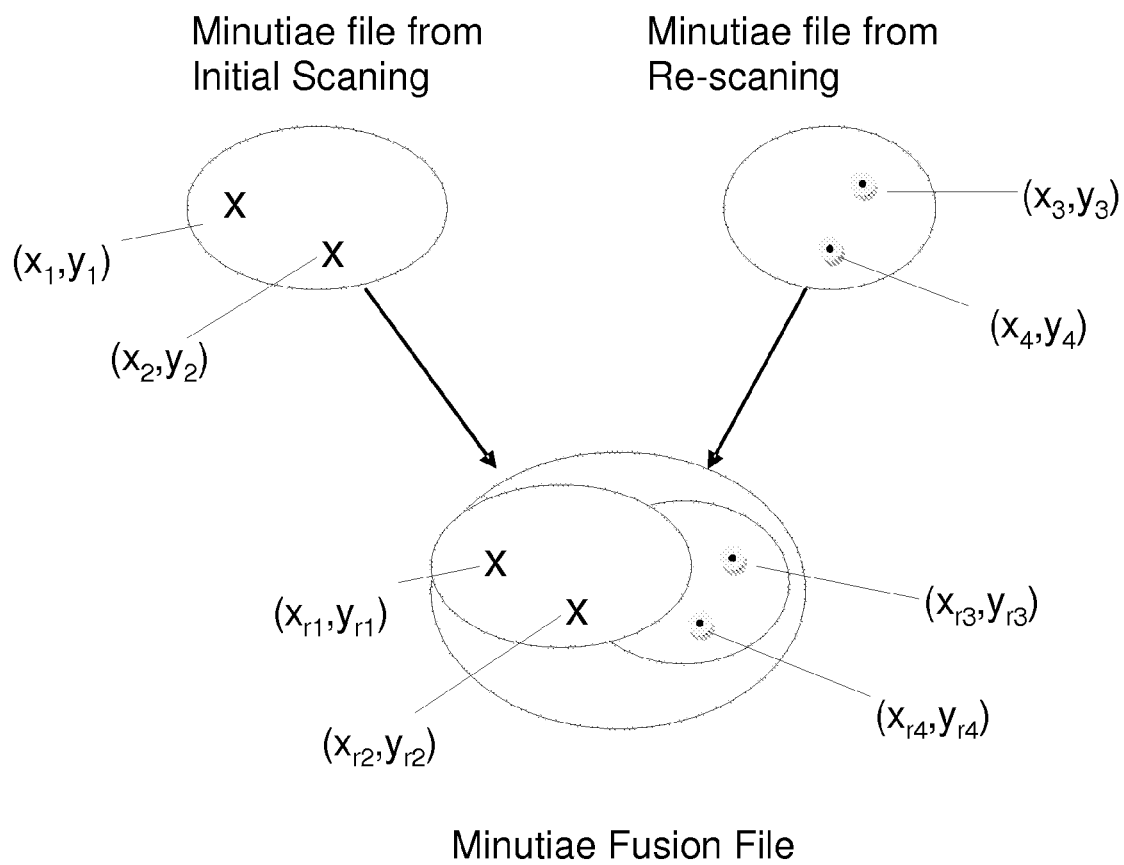
FIG. 3 shows the fusion process correlating two minutiae files.

The FIG. 3 shows a fusion process correlating an initial minutiae file and a re-scanning minutiae file. The $(X_1, Y_1)$ and $(X_2, Y_2)$ are two minutiae points extracted from an initial scanning. The (X3, Y3) and (X4, Y4) are two minutiae points extracted from a re-scanning. The fusion process correlates the four minutiae points by referencing onto a same coordinate system and each minutiae point is represented by $(X_{r1}, Y_{r1})$, $(X_{r2}, Y_{r2})$, $(X_{r3}, Y_{r3})$, and $(X_{r4}, Y_{r4})$.

The invention claimed is:

1. A method of knowledge learning for fingerprint verifications comprises steps of,
   providing a fingerprint scanner;
   providing a fingerprint image database (FID);
   providing a minutiae point extraction and fusion module (MPEFM);
   providing a minutiae point database (MPD);
   providing a master minutiae point database (MMPD) wherein the MMPD comprises a plurality of master minutiae point records; and
   providing a verification module;

operating the fingerprint scanner to scan first set of fingerprints and convert the scanned first set of fingerprints into image data;

transmitting the first set of fingerprint image data to the FID and storing the first set of fingerprint image data in the FID;

performing identifications of first set of minutiae points by the MPEFM from the first set of fingerprint image data;

storing information of the first set of minutiae points in the MPD, wherein the information of the first set of minutiae points is represented by a mathematical vector form;

the mathematical vector form includes information of a x-coordinate, a y-coordinate, and an angle in view of a selected reference Cartesian coordinate system; performing a comparison of the information of the first set of minutiae points with the plurality of master minutiae point records to determine a success of the comparison, wherein the success is determined when quantity of same minutiae points between the first set of minutiae points and minutiae points within a specific master minutiae record exceeds a predetermined quantity requirement; and when the determination is a success, generating a report of success and terminating the verification, when the determination is not a success, determining quantity of scanning performed, wherein when the quantity of scanning equals to a predetermined trial requirement, terminating the verification.

2. The method of knowledge learning for fingerprint verifications of claim 1 further comprises, operating the fingerprint scanner to scan another set of fingerprints and convert the scanned another set of fingerprints into image data only when the comparison is not a success;

in response of the operation of the fingerprint scanner to scan another set of fingerprints, perform further steps including:

transmitting the another set of fingerprint image data to the FID and storing the another set of fingerprint image data in the FID;

performing identifications of another set of minutiae points by the MPEFM from the another set of fingerprint image data;

performing a fusion process to create a combined minutiae point record, wherein the combined minutiae point record includes information of the minutiae points from the first set of fingerprints and the minutiae points from another set of fingerprints.

3. The method of knowledge learning for fingerprint verifications of claim 2, wherein the fusion process comprises steps of:

applying a reference mathematical vector to the mathematical vector of the first set of minutiae points and the mathematical vector of the another set of minutiae points respectively; and identifying unique and duplicate minutiae points between the first set of minutiae points and the another set of minutiae points.

4. The method of knowledge learning for fingerprint verifications of claim 2 wherein, the combined minutiae point record is represented by a mathematical vector form and representing all identified minutiae points from the first set of fingerprint image data and another set of fingerprint image data, wherein all the identified minutiae points are unique.

5. The method of knowledge learning for fingerprint verifications of claim 2 further comprises, in response of the operation of the fingerprint scanner to scan another set of fingerprints, perform further steps including:

performing a comparison of the information of the minutiae points in the combined minutiae point record with the plurality of master minutiae point records to determine a success of the comparison, wherein the success is determined when quantity of same minutiae points between the combined minutiae points and minutiae points within a specific master minutiae record exceeds a predetermined quantity requirement;

when the quantity of scanning is less than the predetermined trial requirement, repeating all of the operations including:

i) scanning another set of fingerprint;

ii) transmitting the another set of fingerprint image data to the FID and store the another set of fingerprint image data in the FID;

iii) identifications of another set of minutiae points by the MPEFM from the another set of fingerprint image data;

iv) a fusion process to create a combined minutiae point record, wherein the combined minutiae point record includes information of the minutiae points from the first set of fingerprints and the minutiae points from another set of fingerprints;

v) applying a reference mathematical vector to the mathematical vector of the first set of minutiae points and the mathematical vector of the another set of minutiae points respectively;

vi) identifying unique and duplicate minutiae points between the first set of minutiae points and the another set of minutiae points; and vii) performing a comparison of the information of the minutiae points in the combined minutiae point record with the plurality of master minutiae point records to determine a success of the comparison.

6. A knowledge learning system for fingerprint verifications comprises, a fingerprint scanner;

a fingerprint image database (FID);

a minutiae point extraction and fusion module (MPEFM);

a minutiae point database (MPD);

a master minutiae point database (MMPD) wherein the MMPD comprises a plurality of master minutiae point records;

a verification module (VM);

the fingerprint scanner to scans first set of fingerprints and converts the scanned first set of fingerprints into image data;

the fingerprint scanner transmits the first set of fingerprint image data to the FID and stores the first set of fingerprint image data in the FID;

the MPEFM identifies first set of minutiae points from the first set of fingerprint image data;

the MPD stores information of the first set of minutiae points, wherein the information of the first set of minutiae points is represented by a mathematical vector form;

the mathematical vector form includes information of a x-coordinate, a y-coordinate, and an angle in view of a selected reference Cartesian coordinate system;

the VM performs a comparison of the information of the first set of minutiae points with the plurality of master minutiae point records to determine a success of the comparison, wherein the success is determined when quantity of same minutiae points between the first set of minutiae points and minutiae points within a specific master minutiae record exceeds a predetermined quantity requirement;

when the determination is a success, generating a report of success and terminating the verification;

the fingerprint scanner scans another set of fingerprints and converts the scanned another set of fingerprints into image data only when the comparison is not a success;

in response of the scanning another set of fingerprints, the scanner transmits the another set of fingerprint image data to the FID and stores the another set of fingerprint image data in the FID;

the MPEFM identifies another set of minutiae points from the another set of fingerprint image data;

the MPEFM performs a fusion process to create a combined minutiae point record, wherein the combined minutiae point record includes information of the minutiae points from the first set of fingerprints and the minutiae points from another set of fingerprints;

the MPEFM performs the fusion process by applying a reference mathematical vector to the mathematical vector of the first set of minutiae points and the mathematical vector of the another set of minutiae points respectively;

the MPEFM identifies unique and duplicate minutiae points between the first set of minutiae points and the another set of minutiae points;

the combined minutiae point record is represented by a mathematical vector form and representing all identified minutiae points from the first set of fingerprint image data and another set of fingerprint image data, wherein the all identified minutiae points are unique with no duplicates;

in response of the scanning of another set of fingerprints, the VM performs a comparison of the information of the minutiae points in the combined minutiae point record with the plurality of master minutiae point records to determine a success of the comparison, wherein the success is determined when quantity of same minutiae points between the combined minutiae points and minutiae points within a specific master minutiae record exceeds a predetermined quantity requirement;

when the determination is a success, generating a report of success and terminate the verification; and when the determination is not a success, determining quantity of scanning performed, wherein when the quantity of scanning equals to a predetermined trial requirement, terminating the verification; and when the quantity of scanning is less than the predetermined trial requirement, repeating all of the operations including:
i) scanning another set of fingerprint;
ii) transmitting the another set of fingerprint image data to the FID and store the another set of fingerprint image data in the FID;
iii) identifications of another set of minutiae points by the MPEFM from the another set of fingerprint image data;
iv) a fusion process to create a combined minutiae point record, wherein the combined minutiae point record includes information of the minutiae points from the first set of fingerprints and the minutiae points from another set of fingerprints;
v) applying a reference mathematical vector to the mathematical vector of the first set of minutiae points and the mathematical vector of the another set of minutiae points respectively;
vi) identifying unique and duplicate minutiae points between the first set of minutiae points and the another set of minutiae points; and
vii) performing a comparison of the information of the minutiae points in the combined minutiae point record with the plurality of master minutiae point records to determine a success of the comparison.

* * * * *